US005890808A

United States Patent [19]
Neff et al.

[11] Patent Number: 5,890,808
[45] Date of Patent: Apr. 6, 1999

[54] IMAGE PROCESSING METHOD AND APPARATUS FOR CORRELATING A TEST IMAGE WITH A TEMPLATE

[75] Inventors: Michael G. Neff, Ferguson; Ted L. Johnson, Florissant; Steven A. Wright; Victor E. Ratkowski, Jr., both of St. Louis, all of Mo.

[73] Assignee: McDonnell Douglas Corporation, St. Louis, Mo.

[21] Appl. No.: 6,407

[22] Filed: Jan. 13, 1998

Related U.S. Application Data

[62] Division of Ser. No. 583,598, Jan. 5, 1996, Pat. No. 5,809,171.
[51] Int. Cl.$^6$ .............................. G06K 9/00; G06K 9/62; G06K 9/68; G06K 9/74
[52] U.S. Cl. ......................... 382/209; 382/181; 382/124; 382/218; 382/219; 382/278; 356/71
[58] Field of Search .................................... 382/181, 124, 382/126, 209, 219, 278, 218; 356/71

[56] References Cited

U.S. PATENT DOCUMENTS

| | | | |
|---|---|---|---|
| 4,581,760 | 4/1986 | Schiller et al. | 382/124 |
| 4,597,009 | 6/1986 | Ballmer et al. | 382/272 |
| 5,067,162 | 11/1991 | Driscoll, Jr. et al. | 382/126 |
| 5,509,083 | 4/1996 | Abtahi et al. | 382/124 |

FOREIGN PATENT DOCUMENTS

| | | | |
|---|---|---|---|
| 0463242A1 | 12/1992 | European Pat. Off. | G06K 9/64 |

OTHER PUBLICATIONS

Report MDC 92E0037, *Development and Demonstration of Advanced Imaging Infrared FPA Seekers and Components*, vol. 1, Technical and Management Proposal, pp. 1-1 through 4-30, 25 Aug. 1992.

Johnson, Ted Lee, *Autonomous Target Detection and Position Estimation Using Estimated Probabilities*, A Thesis Presented to the Faculty of the Graduate School of the University of Missouri–Rolla, 1993.

Report MDC 94B0000, *Multiresolution Processing and Image Understanding for Automatic Target Detection/Recognition/Identification*, Advanced Research Projects Agency Proposal, pp. B–1 through D–6, Jan. 20, 1994.

(List continued on next page.)

*Primary Examiner*—Bipin Shalwala
*Assistant Examiner*—Daniel G. Mariam
*Attorney, Agent, or Firm*—Alston & Bird LLP

[57] ABSTRACT

The image correlation method and apparatus correlates or matches a test image with a template. The image correlation apparatus includes an image processor for partitioning the template into a number of labels, for determining the total number of pixels $N_T$ which form the template and for determining the number of pixels $N_i$ which form each of the labels i. The image correlation apparatus also includes comparison means for comparing the test image to the template. The comparison means determines, for each predetermined gray level j, the number of pixels of the test image $N_{j,i}$ representative of a predetermined gray level j which correspond to a predetermined label i of the template. The comparison means also determines, for each predetermined gray level j, the number of pixels of the test image $N_j$ representative of a predetermined gray level j which correspond to the template. The image correlation apparatus further includes correlation means for determining the correlation X between the test image and the template according to a predetermined equation which is based, at least in part, upon $N_{j,i}$, $N_j$, $N_i$ and $N_T$. The image correlation apparatus can also include an address generator for creating a number of relative offsets between the template and the test image. Thus, the test image can be compared to the template at each relative offset and the relative offset which provides the greatest correlation therebetween can be determined. Consequently, the test image and the template can be effectively matched such that a preselected object designated within the template can be located and identified within the test image.

14 Claims, 8 Drawing Sheets

OTHER PUBLICATIONS

Report MDC 94Q0000–7, *New Aircraft and Missile Products,* Independent Research and Development Data Sheet, Mar. 15, 1994.

Report MDC 94B0159, *Precision Standoff Weapons Control Algorithms,* Technical and Cost Proposal, pp. 1–38, May 19, 1994.

Report MDC 94X0015, *Non–Cooperative Identification Friend Or Foe, Advanced Imaging FPA:IFF,* Technical Summary Final Report, Jul. 31, 1994.

Report MDC 925X002, *Flight Test Performance of the General Pattern Match Cross–Spectral ATR/ATC System,* copyright 1995.

Report MDC 94P0046, *Joint Advanced Strike Technology, Advanced Weapon Delivery System (AWDS) BAA 95–1,* Feb. 3, 1995.

Petros Maragos, *Optimal Morphological Approaches To Image Matching And Object Detection,* Institute Of Electrical And Electronics Engineers, Dec. 1988, pp. 695–699.

IMAGE PROCESSING METHOD AND APPARATUS FOR CORRELATING A TEST IMAGE WITH A TEMPLATE

This is a divisional of U.S. patent application Ser. No. 08/583,598, now U.S. Pat. No. 5,809,171.

FIELD OF THE INVENTION

The present invention relates generally to image processing methods and apparatus and, more particularly, to image processing methods and apparatus which correlate a test image with a template.

BACKGROUND OF THE INVENTION

It is desirable in many instances to match or otherwise correlate a test image with a template. For example, the test image may be an image which was recently obtained or captured, while the template may be based upon a reference image obtained at some prior time. By matching the test image to the template, specific objects or targets which are designated in the template can be identified within the test image. This ability to identify specific objects within the test image which have previously been designated within a template is quite useful in a number of applications, including robotic control and other machine vision applications, automated inspection systems, automated surveillance systems and medical imagery applications. More specifically, in missile guidance applications, it is particularly desirable to automatically identify a target within a test image which has previously been designated in a template or a reconnaissance photograph.

A number of image correlation and image detection methods have been developed to identify previously designated objects within a test image. For example, a number of image correlation systems have been developed which detect edges or other boundaries within the test image. As known to those skilled in the art, edges or boundaries of objects tend to create intensity discontinuities within the test image. Accordingly, by identifying the edges or boundaries of objects, an outline of the objects can sometimes be created. Thereafter, the edge detection systems generally attempt to recognize previously designated objects based upon their spatial relationship to an edge or other boundary which has been identified within the test image.

Another common image detection method is the Hough method. The Hough method is particularly applicable if little, if any, information is known regarding the relative location of an edge or other boundary within the test image, but if the shape of the designated object can be described as a parametric curve since the Hough method is well suited to detect such curves. The Hough method, as well as other image detection methods, are described in a book entitled Computer Vision by Ballard, et al., published by Prentice-Hall, Inc., Englewood Cliffs, N.J. (1982).

Although extensive research has been conducted to efficiently implement image detection systems, such as edge detection systems and systems based upon the Hough method as described above and in more detail in the book entitled Computer Vision, these conventional image detection and correlation systems still suffer from several deficiencies. For example, many conventional image detection methods require significant amounts of data processing and computation in order to effectively compare the test image to the template or reference image. Thus, image detection systems based upon these conventional detection methods may require a significant amount of time in order to compare the test image to the template and to identify the designated object within the test image. While the delays engendered by these lengthy comparison processes are acceptable in many applications, some applications, such as robotic control or other machine vision applications and missile guidance applications, typically require a relatively rapid comparison of the test image to the template and, in some instances, may demand a near real time comparison of the test image to the template in order to effectively identify the designated object or target.

In addition, at least some of these conventional image detection systems require the test image as well as the reference image from which the template is created to be obtained under relatively similar lighting and other environmental conditions in order to properly compare the test image to the template. These environmental conditions include, among other things, the viewpoint, i.e., the angle and direction, from which the template and the test image were obtained. If the lighting or other environmental conditions change between the time at which the reference image from which the template is created is obtained and the time at which the test image is obtained, at least some of these conventional image detection methods require that the image depicted by the template be modeled.

For example, in missile guidance applications in which the template and the test image are images of the terrain or landscape at a predetermined location, conventional image detection methods generally require the viewpoint from which the reference image and the test image are obtained to closely correspond in order to properly identify a designated object within the test image. If, however, the lighting or environmental conditions, such as the respective viewpoints, change between the time at which the reference image is obtained and the time at which the test image is obtained, the terrain at the desired location must generally be modeled from the reference image according to a manual mensuration procession. As known to those skilled in the art, the terrain at the desired location can be mensurated by constructing three-dimensional models of the landscape, including three-dimensional models of any buildings of interest, at the desired location. As also known to those skilled in the art, the construction of appropriate three-dimensional models generally requires the craftsmanship of an expert who is skilled and experienced in the mensuration process. Even with the assistance of a mensuration expert, however, the construction of the appropriate three-dimensional structures can consume hours or sometimes even days.

Once the terrain has been modeled based upon the reference image, the template can be created based upon the model in order to compensate for the variations in the lighting and other environmental conditions between the time at which the reference image was obtained and the time at which the test image is obtained. In this fashion, these conventional image detection systems can compare the template to the test image.

Conventional image detection systems also typically require the reference image and the test image to be obtained by sources of the same spectral type. For example, conventional image detection systems may require both the reference and test images to be obtained by visible wavelength sensors, such as photographic systems. Alternatively, conventional image detection systems may require both the reference and test images to be obtained by infrared sensors or by synthetic aperture radar. In any instance, conventional image detection systems generally do not permit the reference and test images to be obtained by different types or cross-spectral sources. In addition, conventional image detection systems may restrict the types, shapes, locations or materials of the objects which can be reliably designated and identified due, at least in part, to limitations imposed upon the types of sensors which can be employed to create the reference and test images.

SUMMARY OF THE INVENTION

It is therefore an object of the present invention to provide an improved method and apparatus for correlating a test image with a template.

It is another object of the present invention to provide an improved method and apparatus for identifying an object in the test image which has been designated within the template.

It is yet another object of the present invention to provide an image correlation method and apparatus which rapidly compares a test image with a template.

It is still another object of the present invention to provide an image correlation method and apparatus which reliably correlates a test image with a template which have been obtained under different lighting or other environmental conditions.

It is a further object of the present invention to provide an image correlation method and apparatus which reliably correlates a test image with a template which have been obtained by different types or cross-spectral sources.

It is yet a further object of the present invention to provide an image correlation method and apparatus which reliably identifies a designated object within a test image regardless of the type, shape or location of the designated object and regardless of the material from which the designated object is constructed.

These and other objects are provided, according to the present invention, by a method and apparatus for correlating a test image with a template which includes correlation means for determining the correlation X according to:

$$X = \sum_{j=j_{min}}^{j_{max}} \sum_{i=i_{min}}^{i_{max}} N_{j,i} \ln \left[ \frac{N_{j,i}/N_j}{N_i/N_T} \right]$$

Both the test image and template are formed of a number of pixels representative of respective predetermined gray levels. Thus, the image correlation method and apparatus also includes template processing means for processing the pixels which form the template. The template processing means includes means for partitioning the template into a number of labels, each of which are formed of at least one pixel. The template processing means also includes means for determining the total number of pixels $N_T$ which form the template, and means for determining the number of pixels $N_i$ which form each of the labels i.

The image correlation method and apparatus of the present invention also includes comparison means for comparing the test image to the template, such as by overlaying the template on the test image, such that at least some of the pixels of the template correspond to respective pixels of the test image. The comparison means includes means for determining, for each predetermined gray level j, the number of pixels of the test image $N_{j,i}$ representative of a predetermined gray level j which correspond to a predetermined label i of the template. The comparison means also includes means for determining, for each predetermined gray level j, the number of pixels of the test image $N_j$ representative of a predetermined gray level j which correspond to the template. Based upon the values of $N_T$, $N_i$, $N_{j,i}$ and $N_j$, the correlation X between the test image and the template can be determined according to:

$$X = \sum_{j=j_{min}}^{j_{max}} \sum_{i=i_{min}}^{i_{max}} N_{j,i} \ln \left[ \frac{N_{j,i}/N_j}{N_i/N_T} \right]$$

wherein $i_{min}$ and $i_{max}$ are the minimum and maximum label designations, respectively, and wherein $j_{min}$ and $j_{max}$ are the minimum and maximum gray levels, respectively. In order to efficiently compute the correlation X, the image correlation method and apparatus can also include means for determining ln $N_{j,i}$ and ln $N_j$ prior to determining the correlation of the test image with the template.

Based upon the above equation and the pixel-to-pixel comparison of the test image and the template, the image correlation method and apparatus of the present invention can reliably correlate test images and templates which were obtained under different lighting or environmental conditions, such as from different viewpoints. The image correlation method and apparatus of the present invention can also reliably correlate test images and templates which were obtained by different types or cross-spectral sources and can readily identify designated objects within the test image regardless of the type, shape or location of the designated object or the material from which the designated object is constructed.

According to one embodiment, the image correlation method and apparatus also includes offset means for creating a number of relative offsets between the template and the test image. According to this embodiment, the comparison means preferably compares the test image to the template at each relative offset. Consequently, the comparison means preferably determines $N_{j,i}$ and $N_j$ at each relative offset such that the respective correlation X between the test image and the template can also be determined at each relative offset. Further, the image correlation method and apparatus of this embodiment can also include means for determining the relative offset between the test image and the template which provides the greatest correlation therebetween. Consequently, the test image and the template can be effectively matched such that a preselected object designated within the template can be located and identified within the test image.

According to one advantageous embodiment, the pixels which form the test image and the template are assigned respective addresses. Thus, the image correlation method and apparatus can include an address generator which includes the offset means for creating the relative offset between the template and the test image based upon the respective addresses of the pixels of the test image and the template.

The image correlation method and apparatus can also include rotation means for creating at least one relative rotational offset between the template and the test image. According to this embodiment, the comparison means compares the test image to the template at each relative rotational offset. More particularly, the comparison means determines $N_{j,i}$ and $N_j$ at each relative rotational offset such that the correlation X between the test image and the template at each relative rotational offset can also be determined. In addition, the image correlation method and apparatus of this embodiment can include means for determining the relative rotational offset between the test image and the template which provides the greatest correlation therebetween.

In a similar fashion, the image correlation method and apparatus of the present invention can include scaling means for scaling the template relative to the test image according to at least one predetermined scale. According to this embodiment, the comparison means compares the test image to the template at each predetermined scale. More particularly, the comparison means determines $N_{j,i}$ and $N_j$ at each predetermined scale such that the correlation X between the test image and the template can also be determined at each predetermined scale. In addition, the image correlation method and apparatus of this embodiment can include means for determining the predetermined scale which provides the greatest correlation between the template and the test image.

According to a further embodiment, the partitioning means of the image correlation method and apparatus can include means for dividing the predetermined gray levels into a plurality of bins, each of which includes a range of gray levels. The partitioning means of this embodiment also includes means for determining, for each of the bins, an actual count of the number of pixels which are representative of gray levels within the range of gray levels included within the respective bin. The partitioning means can also include means for assigning a predetermined minimum count to each bin which has an actual count which is less than the predetermined minimum count. Further, the partitioning means can include means for reassigning the predetermined gray levels to the plurality of bins such that the greater of the predetermined minimum count or the actual count for each respective bin is within a predetermined range and, according to one advantageous embodiment, is equal. Following this reassignment, the pixels which are representative of gray levels within each bin form a respective label.

According to one more specific embodiment, the partitioning means can also include means for determining the maximum number of pixels of the template which are representative of a single predetermined gray level. Therefore, the partitioning means can also include means for computing the predetermined minimum count to be equal to a predetermined percentage, such as between about 15% and about 25%, of the maximum number of pixels which are representative of a single predetermined gray level.

The image correlation method and apparatus of one particularly advantageous embodiment of the present invention can also include template memory means and image memory means for storing indicia representative of the pixels which form the template and the test image, respectively. In addition, the comparison means can include a number of processing elements, such as field programmable gate arrays, which compare the template to the test image. In particular, the processing elements are adapted to compare, preferably concurrently, the test image to the template at one or more of the relative offsets created by the offset means. Thus, the image correlation method and apparatus of the present invention can efficiently and rapidly determine the relative offset between the template and the test image which provides the greatest correlation therebetween.

The image correlation method and apparatus of the present invention can form a portion of a method and apparatus for recognizing or identifying a preselected object within a test image. The object recognition method and apparatus can also include template generation means for creating a template formed of a number of pixels which are thereafter partitioned into labels, and an image capturing means for capturing the test image. The object recognition method and apparatus can also include object designation means for designating a selected object within the template and object recognizing means for recognizing or identifying the designated object within the test image. Once the image correlation method and apparatus has determined the relative positions of the test image and the template which provide the greatest correlation X therebetween, the object recognition means selects the object within the test image which corresponds to the designated object in the template.

In many instances, the template and the test image are obtained from first and second viewpoints, respectively. Consequently, the image recognition method and apparatus can include an image processor for geometrically warping and/or texture mapping the template to compensate for differences between the first and second viewpoints prior to storing indicia representative of the plurality of pixels which form the template in the template memory means. Further, the image processor can remove at least some of the background shading from the template prior to storing indicia representative of the pixels which form the template in the template memory means in order to further improve the correlation process.

The image processor can also divide the template into a number of pieces in order to further compensate for deformation between the template and the test image. According to this embodiment, the comparison means compares each piece of the template to a predetermined range of the test image. The predetermined ranges of the template are selected such that the offset means of this embodiment can create respective relative offsets for each piece of the template which permit the adjacent pieces of the template to partially overlap or to be spaced apart by a predetermined gap while remaining within the respective predetermined ranges.

According to this embodiment of the present invention, the $N_{j,i}$ determining means includes means for separately determining, for each piece of the template, the number of pixels of the test image $N_{j,i}$ representative of a predetermined gray level j which correspond to a predetermined label i of the respective piece of the template. Likewise, the $N_j$ determining means of this embodiment includes means for separately determining, for each piece of the template, the number of pixels of the test image $N_j$ representative of a predetermined gray level j which correspond to the respective piece of the template. In addition, the correlation means of this embodiment separately determines the correlation X between the test image and each piece of the template at each relative offset between the test image and the respective piece of the template. Accordingly, the relative offset between the test image and each respective piece of the template which provides the greatest correlation therebetween can be determined for each piece of the template. Further, the image correlation method and apparatus of this embodiment can include means for determining an overall correlation between the test image and the template by summing the respective greatest correlation determined for each piece of the template.

According to another embodiment of the object recognition method and apparatus of the present invention, the image capturing step means includes means for capturing a number of temporally distinct test images. According to this embodiment, the comparison means includes means for separately comparing each of the temporally distinct test images to the template such that the respective correlation X between each of the temporally distinct test images and the template can be separately determined. In addition, the means for determining the relative offset which provides the greatest correlation X between the test image and the template can include means for determining, for each relative offset, a sum of the correlations X determined for each of the temporally distinct test images at a respective offset which have been weighted according to a predetermined time-based formula. In addition, the relative offset determining means can also include means for determining the relative offset between the test image and the template which provides the greatest sum of weighted correlations X over time. In this fashion, the probability that the designated object is properly recognized within the test image is enhanced due to the separate correlation and comparison of a number of temporally distinct test images with the template.

Therefore, the image correlation method and apparatus of the present invention can rapidly compare a test image to a template to determine the correlation X therebetween with little, if any, modeling or mensuration required. In addition, the image correlation method and apparatus of the present invention can reliably correlate test images and templates which were obtained under different lighting or other environmental conditions or which were obtained from cross-spectral sources. Further, the image correlation method and apparatus of the present invention can reliably correlate a test image with a template regardless of the type, shape, location or material of the object designated within the template. Consequently, the image correlation method and apparatus of the present invention provides a versatile, reliable and rapid comparison of a test image with a template such that objects which were previously designated within the template can be quickly and accurately identified in the test image.

BRIEF DESCRIPTION OF THE DRAWINGS

The foregoing and other objects, features, and advantages of the present invention will be made apparent from the following detailed description and from the drawings in which.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

The present invention provides, among other things, an image correlation method and apparatus for reliably correlating a test image with a template. Although the image correlation method and apparatus of the present invention is primarily discussed in conjunction with a target recognition system, such as for surveillance or missile guidance applications, the image correlation method and apparatus can be employed in a variety of other applications, such as robotic control and other machine vision applications, inspection systems and medical imagery systems, without departing from the spirit and scope of the present invention.

Figure 1:
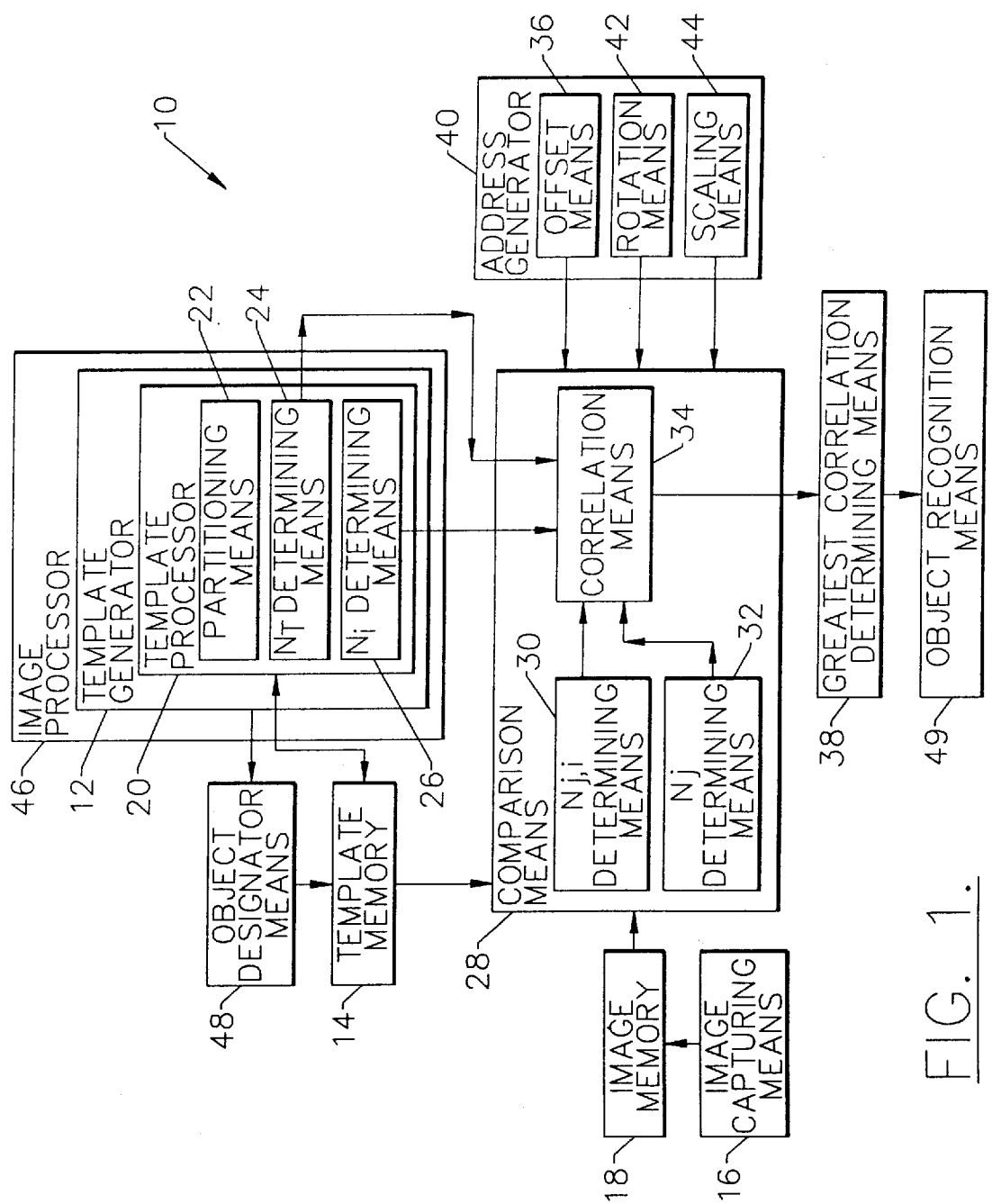
FIG. 1 is a schematic block diagram of the object recognition apparatus, including the image correlation apparatus, of one embodiment of the present invention.

The image correlation method and apparatus 10 of the present invention compares a test image with a template. Thus, the image correlation apparatus of the present invention can include template generation means for creating a template as shown in FIG. 1. The template generation means 12, such as an image processor 46 and associated software, can create the template in a variety of manners. For example, a reference image can be obtained which is digitized to create the template. More particularly, a photograph, such a reconnaissance photograph, can be taken of the area of interest. The photograph can then be digitally scanned to create a template formed of a number of pixels. Each pixel is representative of a predetermined gray level, typically designated 0 to 255, as known to those skilled in the art. As illustrated in FIG. 1, the image correlation apparatus also includes template memory means 14, such as a random access memory device, for storing indicia representative of the plurality of pixels which form the template.

Alternatively, the template can be created by an infrared sensor, a visible wavelength sensor, synthetic aperture radar, or any of a variety of other sensors known to those skilled in the art. Thus, the template generation means 12 typically includes a sensor for obtaining a reference image as well as any associated conversion devices, such as a digital scanner, for converting the reference image to a digital template.

The image correlation method and apparatus 10 compares the plurality of pixels which form the template to a test image, also formed of a plurality of pixels representative of predetermined gray levels. Thus, the image correlation apparatus preferably includes image capturing means 16 for capturing the test image. As described above in conjunction with the template generation means 12, the test image can be captured in a variety of manners, including the digital scanning of reconnaissance or surveillance photographs, or the creation of a test image by infrared sensors, visible wavelength sensors, synthetic aperture radar or any of a variety of other sensing techniques known to those skilled in the art. Thus, the image capturing means typically includes a sensor for obtaining a reference image as well as any associated conversion devices, such as a digital scanner, for converting the reference image to a digital template. As shown in FIG. 1, the image correlation apparatus also includes image memory means 18, such as a random access memory device, for storing indicia representative of the plurality of the pixels which form the test image.

Due to the comparison of the test image to the template provided by the image correlation method and apparatus 10 of the present invention, the template and the test image can be obtained or created by different types of sensors. For example, the template can be created by digitally scanning a reconnaissance photograph, while the test image is captured with an infrared sensor, a visible wavelength sensor or synthetic aperture radar.

Figure 2:
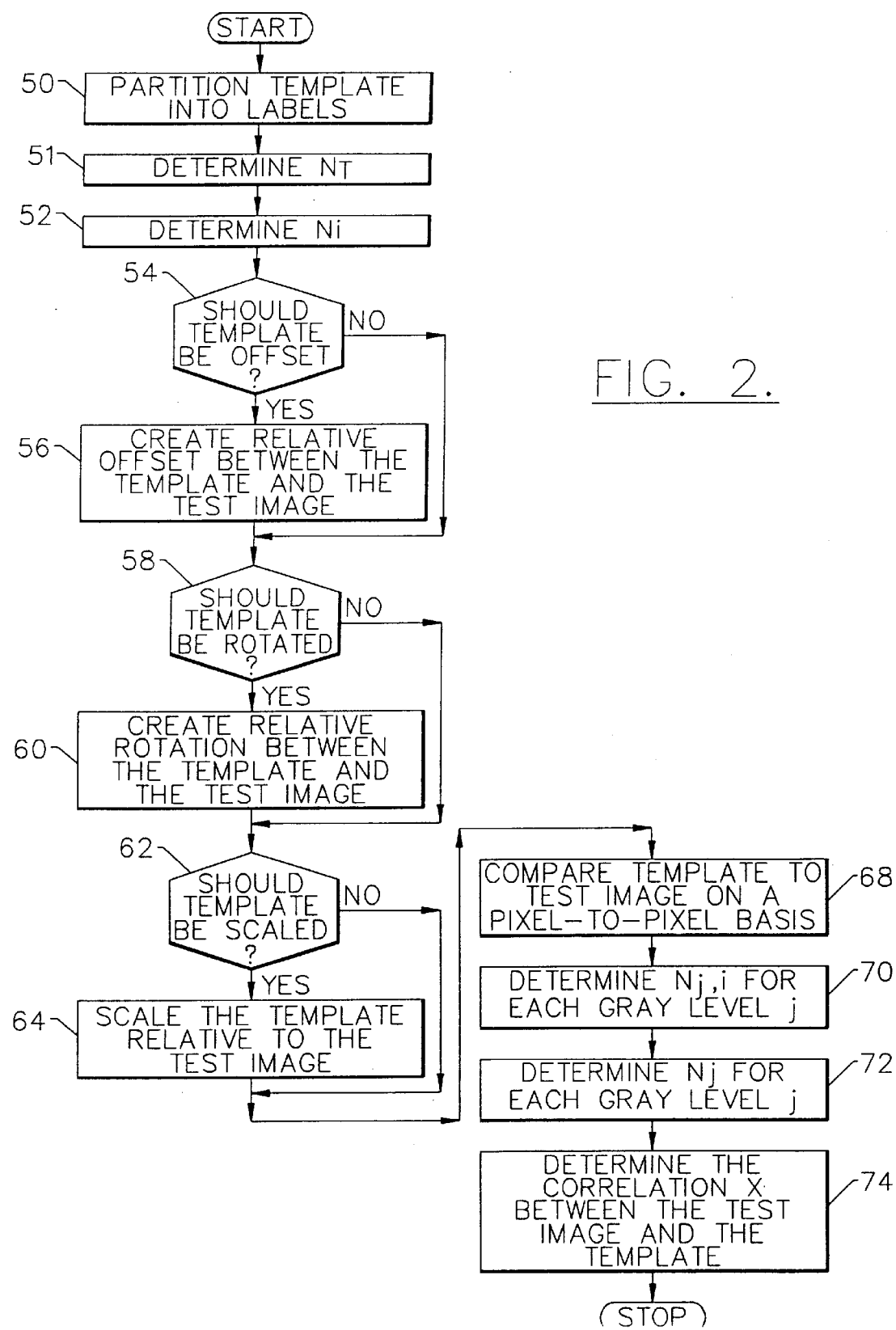
FIG. 2 is a flow chart illustrating operations performed by the image correlation method and apparatus of one embodiment of the present invention.

According to the image correlation method and apparatus 10 of the present invention, the template is initially partitioned into a plurality of labels, each of which is formed by at least one pixel, as shown in block 50 of FIG. 2. The template can be partitioned into labels in a variety of manners without departing from the spirit and scope of the present invention. However, according to one advantageous embodiment, the image correlation apparatus and, more particularly, the template generation means 12, includes template processing means 20 having partitioning means 22 for partitioning a template into a number of labels.

Figure 3:
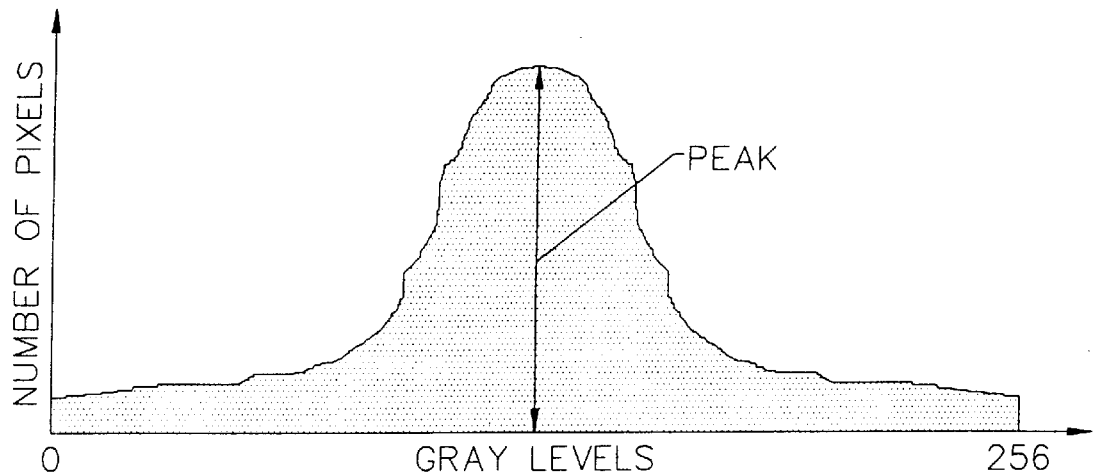
FIG. 3 is an exemplary histogram illustrating the number of pixels of a template which are representative of each of the predetermined gray levels.
Figure 4:
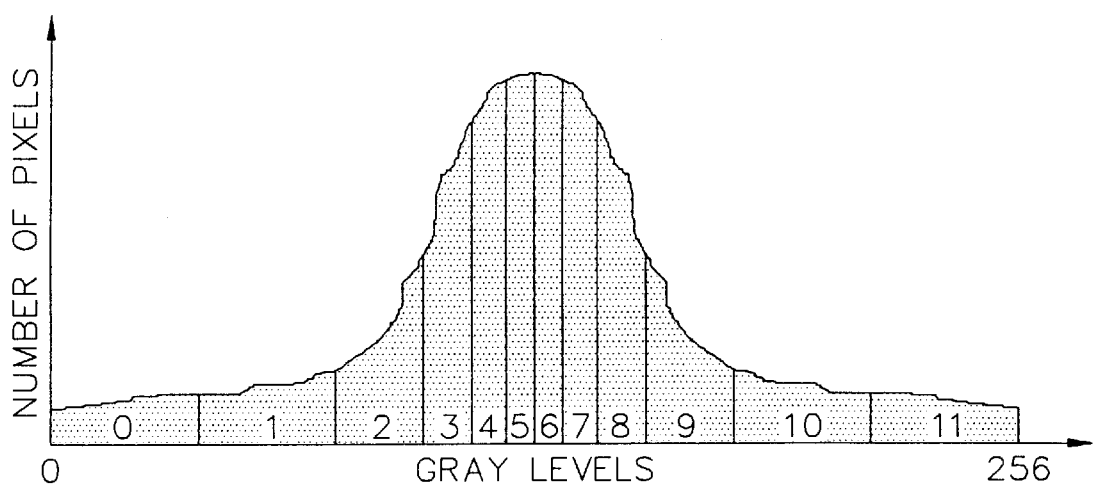
FIG. 4 illustrates the exemplary histogram of FIG. 3 which has been divided into a number of bins during the process of partitioning the template into a number of labels.

According to one advantageous embodiment, the partitioning means 22 partitions the template into labels based upon the relative gray levels of the template pixels. Thus, the partitioning means preferably determines the number of pixels of the template which are representative of each of the predetermined gray levels. As shown in FIG. 3, the partitioning means effectively creates a histogram which depicts the number of pixels of the template which are representative of each of the predetermined gray levels. As shown in block 80 of the flow chart of FIG. 5 which illustrates the label partitioning process in more detail, the partitioning means can also include means for dividing the predetermined gray levels into a number of bins. As illustrated in FIG. 4, each bin, designated 0–11, includes a contiguous range of gray levels. For example, the means for dividing the gray levels into bins can initially divide the gray levels according to a predetermined allocation technique, such as allocating an equal number of gray levels to each bin or allocating predefined ranges of gray levels to the respective bins.

Figure 5:
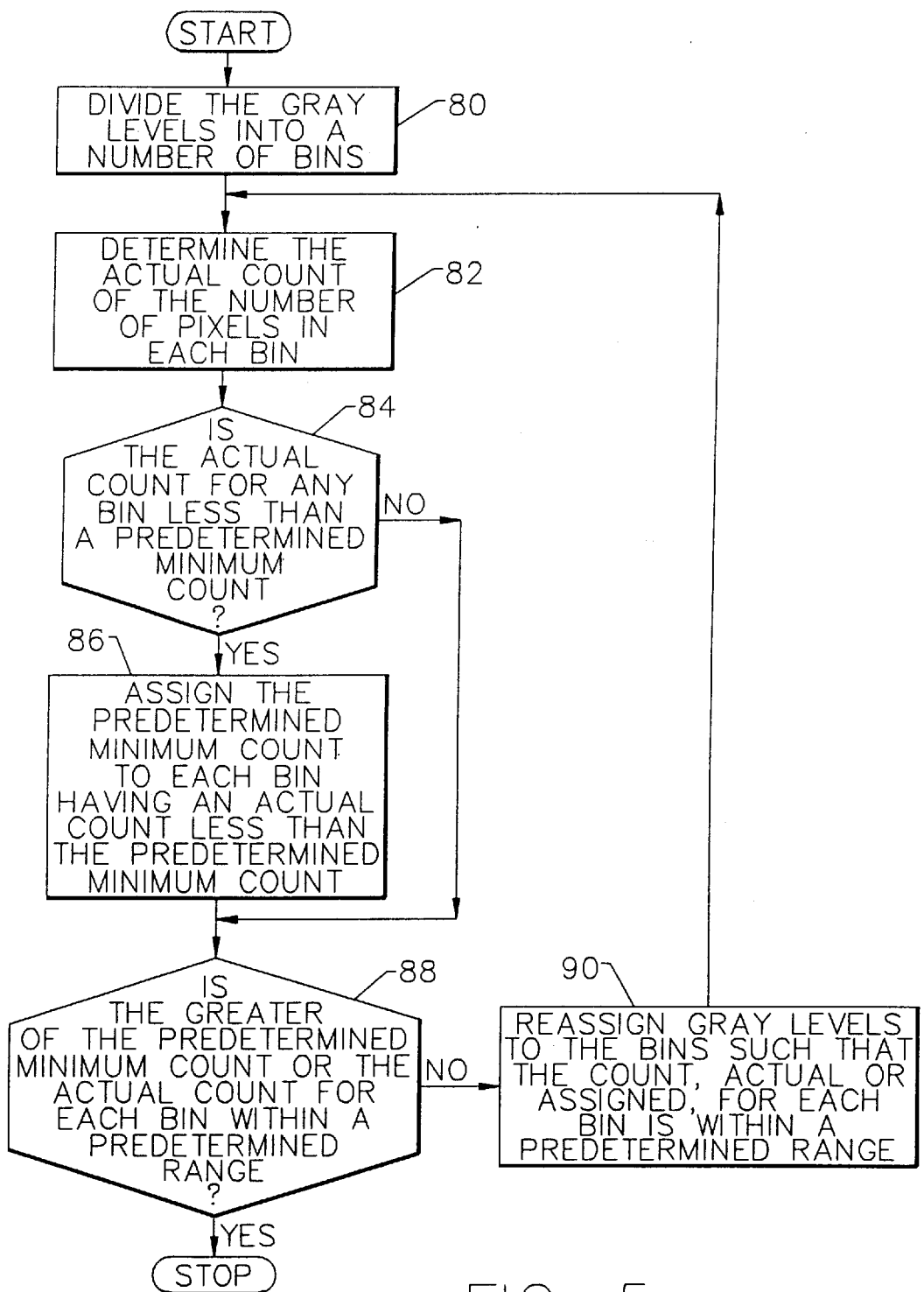
FIG. 5 is a flow chart illustrating the operations performed to partition the template into a plurality of labels.

As shown in block 82 of FIG. 5, the partitioning means 22 can also include means for determining, for each of the bins, an actual count of the number of pixels which are representative of gray levels within the range of gray levels included within the respective bin. The partitioning means can further include means for assigning a predetermined minimum count to each bin which has an actual count which is less than the predetermined minimum count. Thus, the partitioning means compares the actual count of each bin to the predetermined minimum count and replaces the actual count with the predetermined minimum count if the actual count is less than the predetermined minimum count as shown in blocks 84 and 86 of FIG. 5.

The predetermined minimum count can be set to any desired value. However, the partitioning means 18 of one embodiment also includes means for determining the maximum number of pixels of the template which are representative of a single predetermined gray level. This maximum number of pixels is graphically represented as the peak of the histogram of FIGS. 3 and 4. According to this embodiment, the partitioning means can also include means for computing the predetermined minimum count to be equal to a predetermined percentage of the peak, i.e., the maximum number of pixels which are representative of a single predetermined gray level. In one advantageous embodiment, the predetermined percentage is between about 15% and about 25% and, more preferably, is about 20% of the peak value.

The partitioning means 22 of this embodiment also includes means for reassigning the plurality of predetermined gray levels to the bins such that the greater of the predetermined minimum count or the actual count for each respective bin is within a predetermined range as shown in blocks 88 and 90 of FIG. 5. For purposes of illustration, the boundaries of the bins depicted in FIG. 4 can be moved inwardly or outwardly to decrease or increase the number of gray level and, therefore, the number of pixels within a bin, respectively. According to one advantageous embodiment, the gray levels are preferably reassigned to the bins such that greater of the predetermined minimum count or the actual count for each bin is within 5% of the greater of the predetermined minimum count or the actual count for each of the other bins. More preferably, the gray levels are preferably reassigned to the bins such that the greater of the predetermined minimum count or the actual count for each bin is equal.

Figure 6:
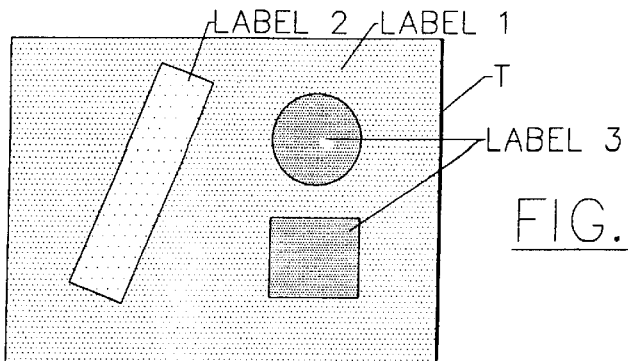
FIG. 6 is a simplified schematic depiction of a template which has been partitioned into three labels.

This process of counting the number of pixels in each bin, assigning the predetermined minimum count to bins having an actual count less than the predetermined minimum count, and reassigning the gray levels can continue repeatedly until the greater of the predetermined minimum count or the actual count for each bin is within a predetermined range. Following the reassignment of the gray levels as described above, the pixels which are representative of gray levels within a respective bin, such as those designated 0–11 in FIG. 4, form a label. By way of example, FIG. 6 illustrates a template T which has been divided into three labels, namely, label 1, label 2, and label 3.

Alternatively, a template can be divided into labels based upon the spatial or relative positional relationship of the pixels without strict regard for the respective gray levels of the pixels. In this fashion, the roof of a building could be designated by a first label, while a river or street is designated by a second label, for example.

As shown in FIG. 1 and in block 52 of FIG. 2, the template processing means 20 also preferably includes means 24 for determining the total number of pixels $N_T$ which form the template. Thus, for a rectangular template formed of 512×512 pixels, the total number of pixels $N_T$ will be 262,144. In addition, the template processing means preferably includes means 26 for determining the number of pixels $N_i$ which form each of the plurality of labels of the template as shown in block 54 of FIG. 2. For example, the $N_i$ determining means would separately determine the number of pixels $N_1$, $N_2$ and $N_3$ which form label 1, label 2, and label 3 of the template, respectively.

Figure 7:
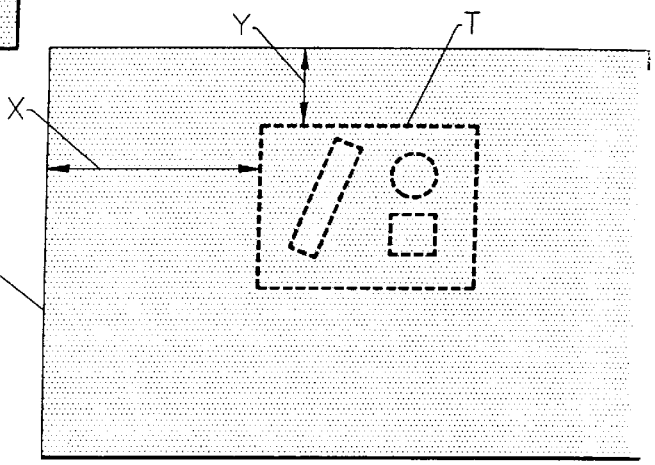
FIG. 7 illustrates the comparison of the template of FIG. 6 which has been partitioned into three labels with a test image.

As shown in FIG. 1 and in block 68 of FIG. 2, the image correlation apparatus 10 also includes comparison means 28, responsive to the template processing means 20, for comparing the test image to the template such that at least some of the pixels of the test image correspond to respective pixels of the template. As shown in FIG. 7, the comparison means essentially overlays the template T onto the test image TI and compares the pixels of the template and the test image on a pixel-by-pixel basis.

As illustrated in FIG. 1 and in block 70 of FIG. 2, the comparison means 28 includes means 30 for determining, for each of the predetermined gray levels j, the number of pixels of the test image $N_{j,i}$ representative of a predetermined gray level j which correspond to a predetermined label i of the template. Thus, for the exemplary comparison illustrated by FIG. 7, the $N_{j,i}$ determining means would separately determine the number of pixels of the test image which correspond to or fall under labels 1, 2 and 3 which have each of the predetermined gray levels, typically designated 0–255. More specifically, for the pixels of the test image which correspond or fall under label 1 of the exemplary template illustrated in FIG. 7, the $N_{j,i}$ determining means would separately determine the number of pixels representative of gray level 0, gray level 1, gray level 2, . . . gray level 255, which correspond to or fall under label 1 in order to determine $N_{0,1}$, $N_{1,1}$, $N_{2,1}$, . . . $N_{255,1}$, respectively. The $N_{j,i}$ determining means would then separately determine the number of pixels of the test image which correspond to or fall under label 2 of the template which have each of the predetermined gray levels. The $N_{j,i}$ determining means would thus continue to determine, for each of the predetermined gray levels, the number of pixels which correspond to or fall under each of the labels in turn.

As also shown in FIG. 1 and in block 72 of FIG. 2, the comparison means 28 also preferably includes means 32 for determining, for each of the plurality of predetermined gray levels j, the number of pixels of the test image $N_j$ representative of the predetermined gray level j which correspond to the template. Thus, in the above example, the $N_j$ determining means would separately determine the number of pixels of the test image representative of gray level 0, gray level 1, gray level 2, . . . gray level 255 which correspond to the template in order to determine $N_0$, $N_1$, $N_2$, . . . $N_{255}$, respectively.

The image correlation apparatus 10 of the present invention also includes correlation means 34, responsive to the template processing means 20, and the comparison means 28, for determining the correlation X between the test image and the template as shown in FIG. 1 and in block 74 of FIG. 2. In particular, the correlation means determines the correlation X according to the following equation:

$$X = \sum_{j=j_{min}}^{j_{max}} \sum_{i=i_{min}}^{i_{max}} N_{j,i} \ln \left[ \frac{N_{j,i}/N_j}{N_i/N_T} \right] \quad (1)$$

As used in equation (1) above, $i_{min}$ and $i_{max}$ are the minimum and maximum labels designations, respectively. For the exemplary template illustrated in FIG. 6 which has three labels designated label 1, label 2 which has and label 3, $i_{min}$ would be 1 and $i_{max}$ would be 3. Similarly, $j_{min}$ and $j_{max}$ are the minimum and maximum gray levels, respectively. Typically, the gray levels are designated 0–255 such that $j_{min}$ is 0 and $j_{max}$ is 255.

The correlation X determined by the correlation means 34 of the image correlation method and apparatus 10 of the present invention effectively measures the correlation or match between the template and the portion of the test image to which the template is compared or overlayed. Thus, greater values of correlation X indicate a greater correlation or match between the test image and the template and, consequently, a higher likelihood that the reference image represented by the template has been located within the test image.

In order to efficiently and rapidly compute the correlation X between the test image and the template, the image correlation method and apparatus of the present invention and, more particularly, the comparison means 28 can include means for determining ln $N_{j,i}$ and ln $N_j$ prior to determining the correlation X. In particular, ln $N_{j,i}$ and ln $N_j$ can be determined during the process of determining $N_{j,i}$ and $N_j$. Consequently, the values of ln $N_j$ and ln $N_j$ for each of the labels and for each of the predetermined gray levels j can be computed and stored, such as in a lookup table within a random access memory device, prior to determining the correlation X between the test image and the template. Thus, these values need not be recomputed during the determination of the correlation X, but can, instead, be recalled or looked up in the appropriate lookup table during the computation of the correlation X between the test image and the template.

Due to the comparison of the test image to the template on a pixel-by-pixel basis in which each corresponding pixel of the template and the test image are compared, the image correlation method and apparatus 10 of the present invention is believed to be significantly less sensitive to noise than conventional image correlation methods which employ, for example, edge or boundary detection techniques. In addition, due, at least in part, to the comparison and correlation of the test image and the template provided by the image correlation method and apparatus of the present invention, the template and the test image can be reliably correlated even though they were obtained or captured by different types of sensors, such as photographic sensors, visible wavelength sensors, infrared sensors or synthetic aperture radar. In addition, the image correlation method and apparatus of the present invention is relatively versatile with few, if any, limitations on the type or size of the structures which can be represented within the template and the test image.

According to one preferred embodiment, the image correlation apparatus 10 also includes offset means 36 for creating a plurality of relative offsets between the template and the test image as shown in FIG. 1 and in blocks 54 and 56 of FIG. 2. Thus, the template can be compared to the test image at each of the relative offsets. Moreover, the $N_{j,i}$ determining means 30 can determine, at each relative offset, the number of pixels of the test image representative of a gray level j which correspond to a predetermined label i of the template. Likewise, the $N_j$ determining means 32 can determine, at each relative offset, the number of pixels of the test image representative of predetermined gray level j which correspond to the template. Consequently, the correlation means 34 can determine the correlation X between the test image and the template at each relative offset. As will be apparent to those skilled in the art, the test image and the template may correlate or match much better at one or more relative offsets than others. The image correlation apparatus of the present invention can therefore also include means 38 for determining the relative offset between the test image and the template which provides the greatest correlation therebetween.

According to one embodiment, the pixels which form the test image and the template are assigned respective addresses. For example, the pixels are typically assigned an address having X and Y components which represent the relative offset of the respective pixels from a reference point, such as one corner of the test image or template, as shown in FIG. 7. According to this embodiment, the image correlation apparatus 10 can also include an address generator 40. The address generator typically includes the offset means 36 as shown in FIG. 1 so as to create the relative offset between the template and the test image based upon the respective addresses of the pixels which form the template and the test image.

The address generator 40 can create relative offsets between the template and the test image such that the template is compared to any number of different regions of the test image without departing from the spirit and scope of the present invention. It is generally preferred to compare the template with a large number of regions of the test image such that the greatest correlation between the template and test image can be more precisely determined. However, the length of time required for this comparison process generally increases as the template is compared to more regions of the test image.

For purposes of illustration, however, the address generator 40 can incrementally increase the relative offset in the X-direction from 0 to the maximum width of the test image for each offset in the Y-direction from 0 to the maximum height such that the template is compared with every possible region of the test image. Alternatively, the address generator can create relative offsets such that the template is compared to regions of the test image which have a greater difference or separation therebetween in order to expedite the comparison process. Although the comparison of the template to the test image at each of the relative offsets can be performed sequentially, these comparisons are preferably performed concurrently in order to further expedite the image correlation process, as described hereinafter. In addition, the test image could be moved relative to a stationary template in order to create the relative offset therebetween without departing from the spirit and scope of the present invention.

Figure 8:
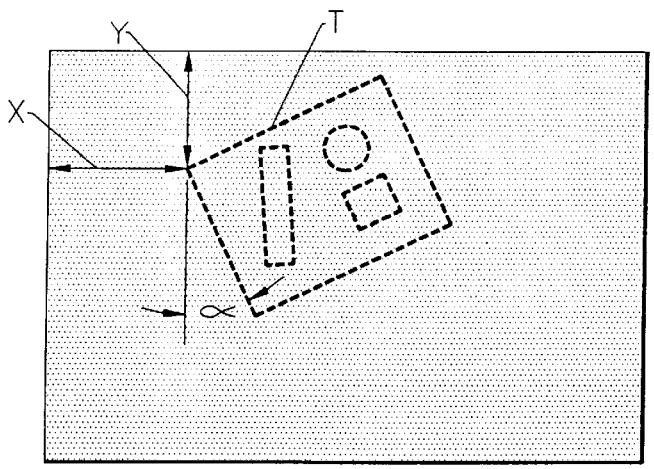
FIG. 8 illustrates the comparison of the template of FIG. 6 which has been partitioned into three labels to a test image in which a relative rotational offset has been created between the test image and the template.

As shown in blocks 58 and 60 of FIG. 2, the image correlation apparatus 10 of the present invention and, more particularly, the address generator 40 can also include rotation means 42 for creating at least one relative rotational offset α between the template and the test image. As shown in FIG. 8, for example, a relative rotational offset is created between the template and the test image. While the template is rotated relative to the test image in FIG. 8, the template can, instead, be rotated relative to the test image without departing from the spirit and scope of the present invention.

As described above in conjunction with the offset means 36, the test image can then be compared to the template at each relative rotational offset. In this regard, the $N_{j,i}$ determining means 30 can determine, at each relative rotational offset, the number of pixels of the test image $N_j$ representative of a predetermined gray level j which correspond to a predetermined label i of the template. In addition, the $N_j$ determining means 32 can determine, at each relative rotational offset, the number of pixels of the test image $N_j$ representative of a predetermined gray level j which correspond to the template. Consequently, the correlation means 34 can determine the correlation X between the test image and the template at each relative rotational offset.

The image correlation apparatus 10 of this embodiment can also include means 38 for determining the relative rotational offset between the test image and the template which provides the greatest correlation therebetween. Thus, the template and the test image can be compared at a number of relative offsets in order to determine the relative positions of the template and the test image which provides the greatest correlation or the best match therebetween.

Figure 9:
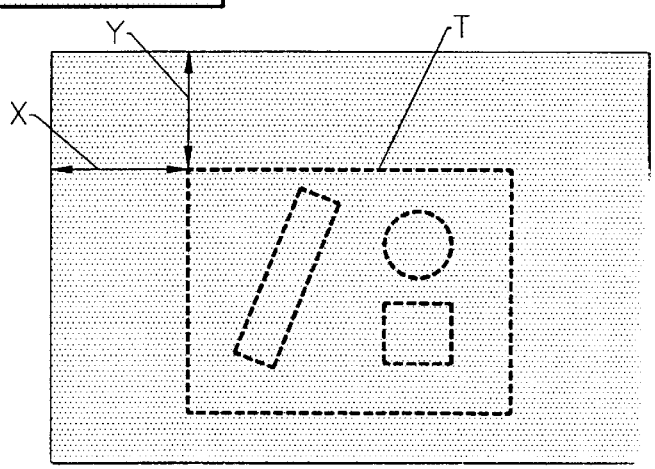
FIG. 9 illustrates the comparison of a template of FIG. 6 partitioned into three labels to a test image in which the template has been enlarged by a predetermined scale.

In order to provide even greater versatility to the image correlation method of the present invention, the image correlation apparatus 10 and, more particularly, the address generator 40, can also include scaling means 44 for scaling the template relative to the test image according to at least one predetermined scale as shown in blocks 62 and 64 of FIG. 2. As illustrated in FIG. 9, the template can be increased in scale or enlarged relative to the test image. However, the template can, instead, be reduced in scale relative to the test image without departing from the spirit and scope of the present invention. Alternatively, the scaling means can scale the test image relative to the template, i.e., can enlarge or reduce the size of the test image relative to the template, instead of enlarging or reducing the size of the template, without departing from the spirit and scope of the present invention.

The image correlation method and apparatus 10 of this embodiment also preferably compares the test image to the template at each predetermined scale. In particular, the $N_{j,i}$ determining means 30 can determine, at each predetermined scale, the number of pixels of the test image $N_{j,i}$ representative of a predetermined gray level j with correspond to a predetermined level i of the template. Likewise, the $N_j$ determining means 32 can include means for determining, at each predetermined scale, the number of pixels of the test image $N_j$ representative of a predetermined gray level j with correspond to a predetermined level i of the template. Consequently, the correlation means 34 can determine the correlation X between the test image and the template at each predetermined scale. Furthermore, the image correlation apparatus can include means 38 for determining the predetermined scale which provides the greatest correlation or match between the template and the test image. Thus, the image correlation method and apparatus of the present invention can effectively correlate or match test images and templates which are initially scaled differently, thereby further increasing the versatility and functionality of the image correlation method and apparatus of the present invention.

While, the generation of relative offsets, relative rotational offsets and scaling factors by the address generator 40 and, more particularly, by the offset means 36, the rotation means 42 and the scaling means 44, respectively, have been separately discussed hereinabove, the relative positions and sizes of the test image and the template can be adjusted by a combination of two or all three of the foregoing offsets or scaling. Thus, the template can be both rotated and scaled by a predetermined number of angles and scales relative to the test image without departing from the spirit and scope of the present invention. Thus, the image correlation method and apparatus 10 can more precisely determine the relative positions and sizes of the test image and the template which produce the greatest correlation or match therebetween.

Figure 10:
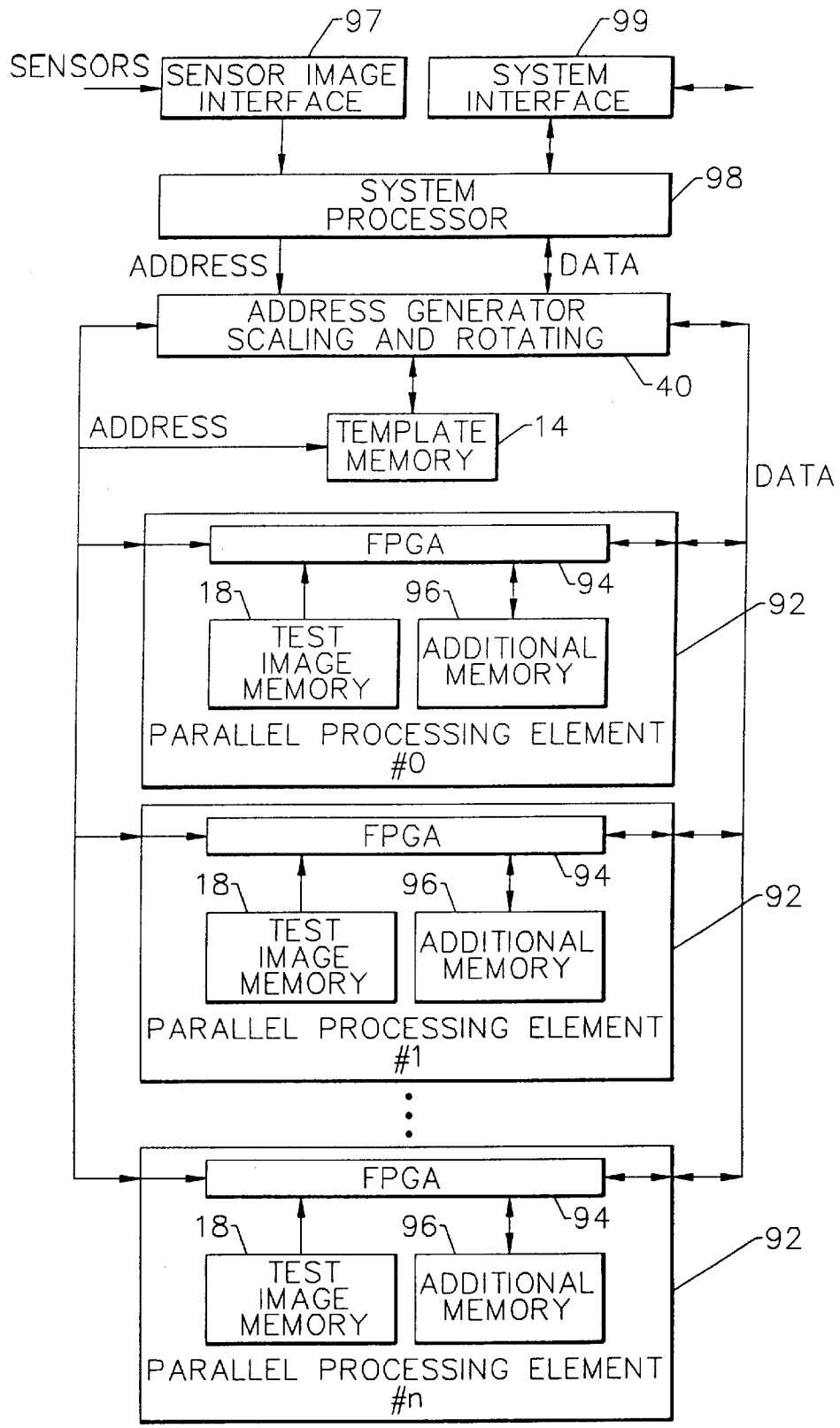
FIG. 10 is a schematic block diagram of the image correlation apparatus including a plurality of parallel processing elements of one embodiment of the present invention.

According to one advantageous embodiment illustrated in FIG. 10, the comparison means 34 can include a plurality of processing elements 92 responsive to the template memory means 14 and the image memory means 18. As shown, each processing element preferably includes a field programmable gate array 94 for comparing the template to the test image and one or more memory devices 96, such as random access memory devices. However, the processing elements can, instead, include a combination of software and hardware, such as a microprocessor, a gate array, an application specific integrated circuit or a custom integrated circuit without departing from the spirit and scope of the present invention. More particularly, each processing element preferably includes the $N_{j,i}$ determining means 30 and the $N_j$ determining means 32 as described above. In addition, each processing element can include the correlation means 34 for determining the correlation X between the test image and the template according to equation (1).

As illustrated in FIG. 10, each processing element 92 can include the test image memory means 18 and can be operably connected to the template memory means 14 such that the pixels representative of the test image and the template can be compared by each of the processing elements. According to the present invention, the processing elements are preferably disposed in parallel such that the comparison of the test image and the template can be performed concurrently by the processing elements.

In addition, the image correlation apparatus 10 illustrated by FIG. 10 includes an address generator 40, including the offset means 36, rotation means 42 and scaling means 44, for creating a plurality of relative offsets between the template and the test image. Thus, the pixels which form the template can be provided to the processing elements 92 along with the respective offsets of the template to the test image. In particular, the address generator 40 can supply pixel addresses to the respective processing elements which specify or define the relative positions of the template pixels to the test image pixels and consequently, determines the relative offset therebetween. In addition, the address generator can provide a different set of pixel addresses to each of the processing elements such that the processing elements compare versions of the template which have been offset by different amounts to the test image. Consequently, processing element 0 can compare the template to the test image with no relative offset therebetween, processing element 1 can compare the template to the test image with a first relative offset therebetween, processing element 2 can compare the template and the test image with a second relative offset therebetween, and so on.

As described above, the address generator 40 can also include the relative rotation means 42 and scaling means 44 for providing a relative rotational offset between the template and the test image and for scaling the template relative to the test image. In particular, the address generator can supply pixel addresses to the respective processing elements 92 which specify or define the relative positions of the template pixels to the test image pixels and, consequently, determines the relative rotation or scaling therebetween. In addition, the address generator can provide a different set of pixel addresses to each of the processing elements such that the processing elements compare versions of the template which have been rotated or scaled by different amounts to the test image.

For example, processing element 0 can compare the test image to the template with no relative rotational offset therebetween, processing element 1 can compare the test image to the template with a first relative rotational offset therebetween, processing element 2 can compare the test image to the template with a second relative rotational offset therebetween, and so on. Likewise, processing element 0 can compare the template to the test image with no relative scaling of the template to the test image, processing element 1 can compare the template to the test image with a first relative scaling of the template to the test image, processing element 2 can compare the template to the test image with a second relative scaling of the template to the test image, and so on. As described above, by concurrently performing each of these comparisons of the test image to the template, the image correlation method and apparatus 10 of the present invention efficiently and rapidly correlates or matches the test image and the template.

Each processing element 92 also preferably includes an additional memory device 96, such as a random access memory device, which serves, among other functions, as a scratchpad during the determination of $N_{j,i}$ and $N_j$ as well as the determination of the correlation X between the test image and the template. Following the comparison of the test image and the template, the correlation X can be stored by the processing element, such as within the additional memory device of the respective processing element.

Alternatively, the correlation X can be transmitted to the system processor 98 for storage and subsequent processing. In particular, the system processor can include the means 38 for determining the greatest correlations between the test image and the template. Thus, the system processor can compare the respective correlations X determined by each of the processing elements at each of the relative offsets, relative rotational offsets and/or relative scales to determine the relative positions of the test image and the template which provides the greatest correlation therebetween. As schematically depicted in FIG. 10, the system processor is preferably operably connected to one or more sensors via a sensor image interface 97 and to a computer network or system via a system interface 99 in order to provide operator interaction with the image correlation apparatus as desired.

The test image and the reference image from which the template is constructed are oftentimes obtained from different viewpoints, such as from different angles and/or from different directions. For example, the template and the test image can be obtained from first and second viewpoints, respectively. For the missile guidance applications illustrated in FIG. 11, a navigation system 10 can monitor and determine the first and second viewpoint at which the template and the test image were obtained.

In order to at least partially compensate for the differences between the first and second viewpoints, the image processor 66 which forms the template generator means 12 can geometrically warp the template. This geometric warping is typically performed prior to storing indicia representative of the pixels which form the template in the template memory means 14 as shown in blocks 102 and 108 of FIG. 11, respectively. As known to those skilled in the art, the geometric warping of an image is typically performed by means of transformation viewpoint equations which are implemented by the image processor. For a more detailed description of geometric warping see a book entitled Computer Graphics: Principles and Practice by Foley et al., published by Addison-Wesley Publishing Company, Inc., Reading, Massachusetts (1990).

Figure 11:
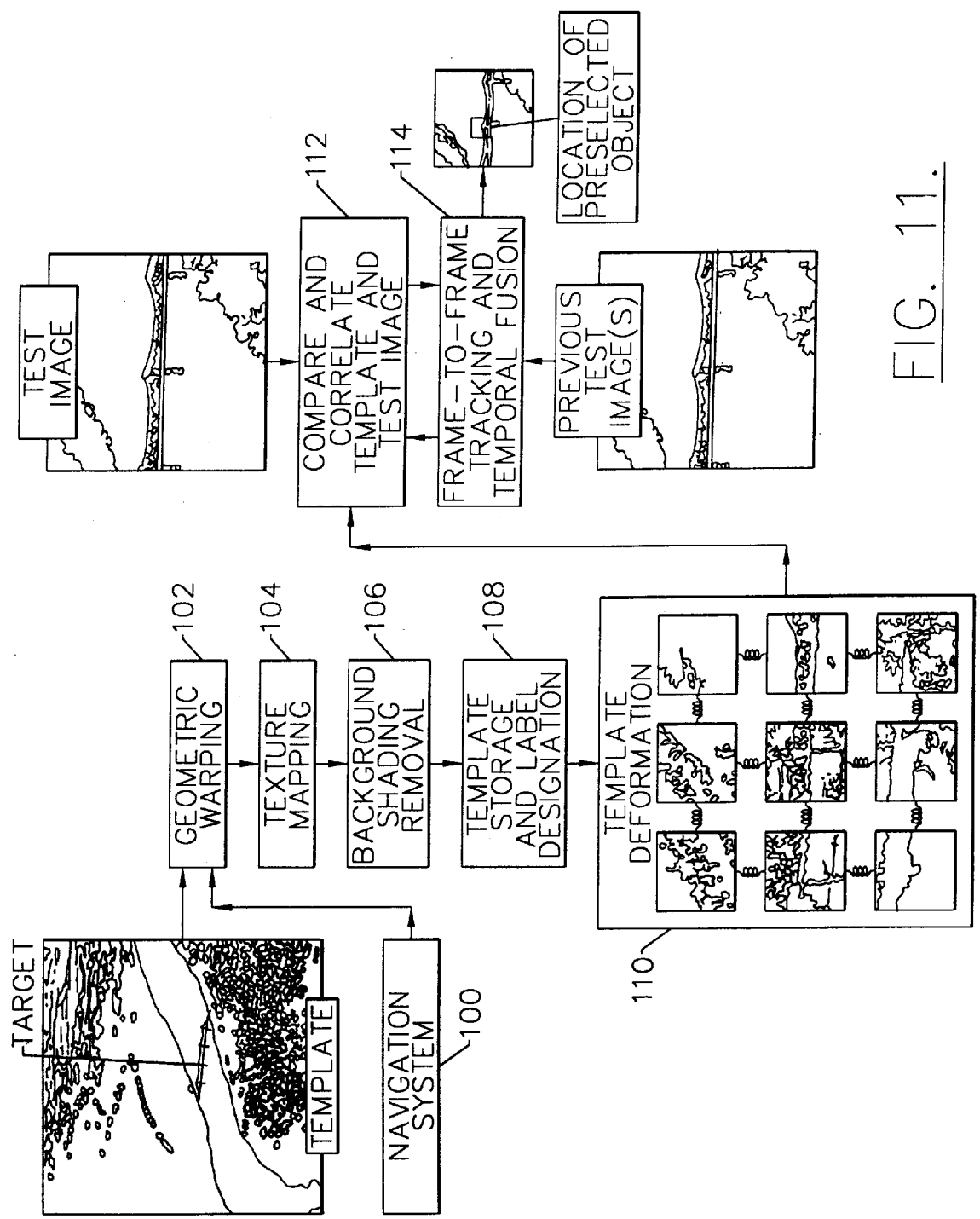
FIG. 11 is a block diagram illustrating the operations performed by an object recognition method and apparatus of one embodiment of the present invention which includes an image correlation method and apparatus.

Likewise, the image processor 46 can texture map the template to further compensate for differences between the first and second viewpoints as shown in block 104 of FIG. 11. The template is also preferably texture mapped by the image processor prior to be being stored within the template memory means 14. By texture mapping the template, localized details within the template or within the reference image from which the template is constructed are morphed onto a three-dimensional shape. A more detailed description of texture mapping is also provided by the book entitled Computer Graphics: Principles and Practice. Since the geometric warping and texture mapping compensate for differences between the first and second viewpoints, it is generally unnecessary to geometrically warp and/or texture map the template prior to storing indicia representative of the pixels which form the template in the template memory means in instances in which the first and second viewpoints are closely related.

The image processor 40 can also remove at least some of the background shading from the template in order to further improve the image correlation process as shown in block 106 of FIG. 11. The removal of at least some of the background shading is also preferably performed prior to storing indicia representative of the pixels which form the template in the template memory means 14. The image processor can remove at least some of the background shading from the template according to any method known to those skilled in the art. However, according to one advantageous embodiment, the image processor removes at least some of the background shading by determining the average gray level of the pixels in a predetermined region about each individual pixel. This average gray level value is then subtracted from the gray level of the individual pixel. Once this process has been repeated for each pixel of the template, a predetermined value, can be added to the gray level of each pixel in order to create a template in which at least some of the background shading has been removed.

The image correlation method and apparatus 10 image of the present invention also provides for adaptive deformation between the template and the test image to further increase the versatility and effectiveness of the present invention. As illustrated schematically in block 110 of FIG. 11, the image processor 40 can divide the template into a number of pieces, such as nine equal-sized pieces. Each of the template pieces can then be compared to a predetermined region of the test image in order to determine the correlation of the template pieces to the test image, while allowing at least some deformation between the pieces of the template, as shown in block 112 of FIG. 11.

According to this embodiment, the $N_{j,i}$ determining means 30 can include means for separately determining, for each piece of the template, the number of pixels of the test image $N_{j,i}$ representative of a predetermined gray level j which correspond to a predetermined label i of the respective piece of the template. Likewise, the $N_j$ determining means 32 of this embodiment can include means for separately determining, for each piece of the template, the number of pixels of the test image $N_j$ representative of a predetermined gray level j which correspond to the respective piece of the template. Based upon the values of $N_{j,i}$ and $N_j$ which have been determined separately for each piece of the entire template, the correlation means 34 can separately determine the correlation of each piece the template to the test image according to equation (1).

Each piece of the template is preferably compared to a portion of the test image within the predetermined range of the test image which is assigned to the respective piece of the template. As described hereinafter, the predetermined regions of the test image are preferably selected such that the pieces of the template can partially overlap or can be spaced apart. Thus, the template as a whole can be compared and correlated with the test image, while allowing the individual pieces of the template to move slightly relative to one another, thereby further compensating for deformations, if any, between the template and the test image.

Figure 12:
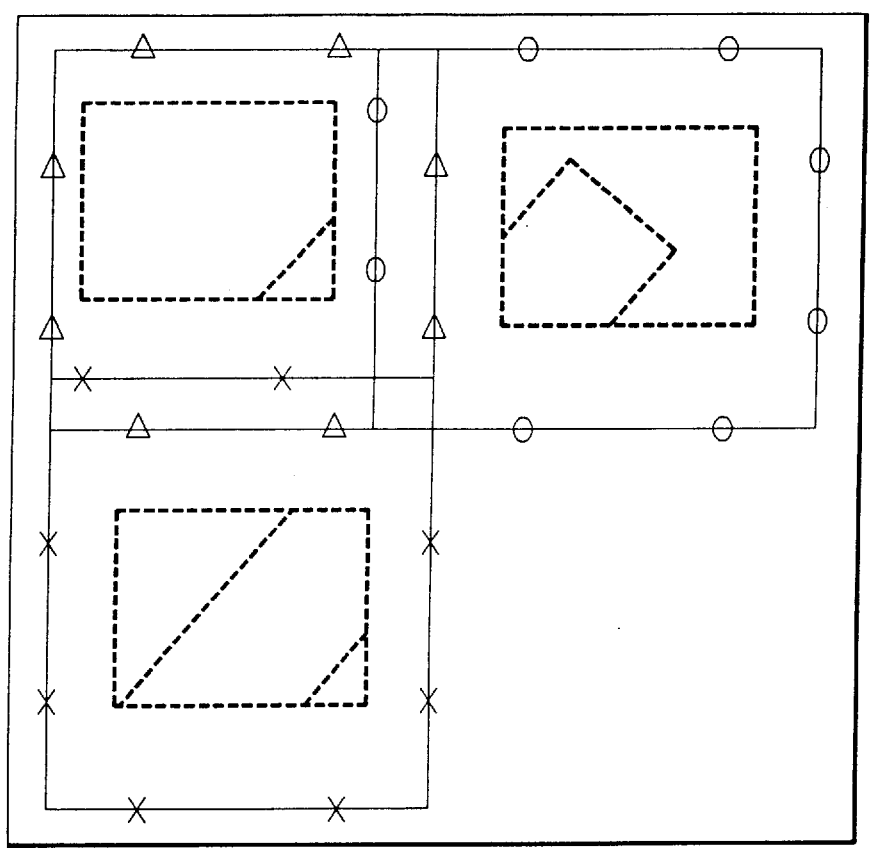
FIG. 12 illustrates the comparison of a template to a test image in which the template has been divided into a number of pieces for comparison with a predetermined ranges of the test image.

For purposes of illustration, three pieces of the template illustrated in FIG. 6 are shown in FIG. 12. As shown, the template is preferably divided into pieces such that those portions of the test image along the borders or boundaries of a first piece of the template are also included along the borders of a second piece of the template, adjacent the first piece. Thus, at least some portions of the test image will be included along the borders or boundaries of two or more pieces of the template to insure that all portions of the test image are compared to the template. However, the template can be evenly divided into pieces which do not contain common portions of the test image along their borders without departing from the spirit and scope of the present invention.

FIG. 12 also illustrates the predetermined range of the test image within which each of the three exemplary pieces of the template can be compared by the rectangular boxes surrounding the template pieces. For illustrative purposes, the rectangular boxes which define the respective predetermined ranges of the three pieces of the template have been designated with a number of x's, circles and triangles, respectively. It should be apparent to one skilled in the art, however, that the rectangular boxes and the associated designations form no portion of the template or the test image, but are merely shown in FIG. 12 to illustrate the size of the respective predetermined ranges relative to the pieces of the template and to graphically depict the overlap between the predetermined ranges.

As described above, these predetermined regions at least partially overlap such that the respective template pieces can also at least partially overlap. As shown in FIG. 12, the template pieces are preferably smaller in size than the predetermined region in which they can be positioned. Consequently, the pieces of the template can be compared to portions of the test image within the predetermined range without overlapping an adjacent piece of the template, thereby permitting a slight gap between the adjacent pieces of the template.

According to this embodiment of the present invention, the image correlation apparatus 10 also preferably includes offset means 36 for creating a number of relative offsets between the pieces of the template and the test image. Thus, by appropriately selecting the relative offsets between the pieces of the template and the test image, the pieces of the template can be compared to several different portions of the test image within the predetermined range. Consequently, the comparison means 28 can separately determine for each piece of the template the values of $N_{j,i}$ and $N_j$ at each relative offset and the resulting correlation X between each piece of the template and the test image at each relative offset. The comparison means can then separately determine for each piece of the template the relative offset which provides the greatest correlation X between the respective piece of the template and the test image. Thereafter, the comparison means can sum the greatest correlation X determined for each piece of the template to determine the resulting correlation of the template, which is formed of a number of pieces, to the test image.

The offset means 36 can also create a number of relative offsets between the template, as a whole, and the test image. In particular, the image correlation apparatus 10 of the present invention can determine the correlation in the manner described above between a template, which is formed of a number of pieces, and the test image which is positioned in a first relative position thereto. Thereafter, the image correlation apparatus can determine the correlation in the manner described above between the template and the test image which is positioned in a second relative position thereto by the offset means. Accordingly, the image correlation apparatus of the present invention can determine the correlation between the template, which is formed of a number of pieces, and the test image at a number of predetermined relative positions such that the relative position between the template and the test image which provides the greatest correlation therebetween can be determined as described below.

Likewise, the image correlation method and apparatus 10 of this embodiment can also include rotation means 42 and scaling means 44 as described above such that the correlation X can be determined between the test image and the template at each relative rotational offset and at each relative scaling. For each relative rotational offset and for each relative scaling, the image correlation apparatus preferably determines the relative position of each piece of the template which provides the greatest correlation between the respective piece of the template and the test image in the manner described above. The overall correlation of the template to the test image can then be determined at each relative rotational offset and each relative scaling by summing the greatest correlation of each respective piece of the template. Thus, the image correlation method and apparatus of the present invention can determine the relative offset, relative rotational offset and/or relative scale between the test image and the template, which is formed of a number of pieces, which provides the greatest correlation therebetween.

In this regard, the image correlation method and apparatus 10 of this embodiment of the present invention can also include means 38, such as the system processor 40, for determining the relative offset between the test image and the template which provides the greatest correlation therebetween. If this greatest correlation between the test image and the template is greater than a predetermined minimum correlation, the test image and the template are considered to have been matched and a preselected object designated within the template can be located and identified within the test image as described hereinbelow.

In one advantageous embodiment illustrated in FIG. 10 in which the template is positioned at a predetermined relative offset, a predetermined relative rotational offset and a predetermined relative scale to the test image, the plurality of processing elements 92 can concurrently compare the same piece of the template to the test image at a variety of relative offsets within the predetermined range of the test image assigned to the respective piece in order to determine the greatest correlation therebetween. Subsequently, the plurality of processing elements can concurrently compare a second piece of the template to the test image at a variety of respective relative offsets within the predetermined range of the test image assigned to the second piece in order to determine the greatest correlation therebetween. This comparison process can continue until each of the pieces of the template has been compared to their respective predetermined range of the test image. The respective greatest correlations of each individual piece of the template can then be summed to determine the overall correlation between the template and the test image at the predetermined relative offset, the predetermined relative rotational offset and the predetermined relative scale. Thereafter, the comparison process can be repeated with the template positioned at other predetermined offsets, other predetermined rotational offsets and/or other predetermined scales relative to the test image in order to determine the overall correlation between the template and the test image at each of these other offsets and/or scales.

In order to further increase the probability that the template is correctly correlated or matched with a portion of the test image, the image correlation method and apparatus 10 of the present invention can correlate a number of temporally distinct test images with the template. The image correlation method and apparatus can then weight the results to more accurately match the template with a portion of the test image. Thus, the test image capturing means 16 of this embodiment preferably includes means for capturing a predetermined number of temporally distinct test images, such as ten test images captured in 1 second increments. According to this embodiment, the comparison means 28, such as the plurality of processing elements 92, includes means for separately comparing each of the temporally distinct test images to the template as shown schematically in block 114 of FIG. 11. Consequently, the $N_{j,i}$ determining means can include means for separately determining the number of pixels of the temporally distinct test images $N_{j,i}$ representative of a predetermined gray level j which correspond to a predetermined label i of the template. Likewise, the $N_j$ determining means can include means for separately determining the number of pixels of the temporally distinct test images $N_j$ representative of a predetermined gray level j which correspond to the template. Thus, the correlation means 34 can separately determine the correlation X between each of the temporally distinct test images and the template.

Additionally, the means 38 for determining the relative offset between the test image and the template which provides the greatest correlation X can include means for determining, for each relative offset, a sum of the correlations X determined for each of the temporally distinct test images which have been weighted according to a predetermined time-based formula. The correlations determined for each of the temporally distinct test images at a respective offset can be weighted according to a variety of formulas without departing from the spirit and scope of the present invention. However, the time-based formula of one advantageous embodiment weights the correlations determined for each of the temporally distinct test images at a respective offset such that correlations X determined for the more recent test images are assigned a higher or great weight than the older or more distant test images.

For example, for a number of temporally distinct test images designated $TI_1, TI_2, \ldots TI_{10}$ in which $TI_1$ is the oldest test image and $TI_{10}$ is the newest test image, the respective correlations X determined for each of these temporally distinct test images at a respective offset can be weighted such that the correlations X determined for the more recent test images are assigned a higher or greater weight than the older or more distant test images. For example, for a number of temporally distinct test images designed $TI_1, TI_2, \ldots TI_{10}$ in which $TI_1$ is the oldest test image and $TI_{10}$ is the newest test image, the respective correlations X determined for each of these temporally distinct test images can be weighted by being multiplied by 0.1, 0.2, 0.3, . . . 1.0, respectively. Thus, the correlations X associated with the more recent test images are weighted more heavily and contribute more significantly to the resulting correlation X of the series of test images to the template. As described above, the relative offset between the test image and the template which provides the greatest sum of weighted correlations X over time can then be determined in order to more precisely match or correlate the template to a portion to the test image.

Although the image correlation method and apparatus 10 can be employed in a variety of applications without departing from the spirit and scope of the present invention, the image correlation method and apparatus 10 of the present invention can form a portion of an object recognition method and apparatus which is adapted to recognize or identify a preselected object or target within a test image as shown in FIG. 11. Consequently, the object recognition method and apparatus can include object designation means 48, responsive to the template generation means 12, for designating the selected object or target within the template. Following comparison of the template to the test image and the determination of the relative position of the template to the test image which provides the greatest correlation X therebetween, the selected object designated within the template can be identified or located within the test image. In particular, the object designated in the template can be identified or located within the portion of the test image which provides the greatest correlation or match with the template. In particular, the object recognition method and apparatus of the present invention can include object recognition means 49 for selecting an object within the test image at the relative offset which provides the greatest correlation or match with the template which corresponds to the designated object in the template. Consequently, a previously selected object, such as a target designated in a reconnaissance photograph or a preselected part of a complicated mechanical assembly, can be thereafter reliably identified or located within a test image.

Therefore, the image correlation method and apparatus 10 of the present invention can rapidly compare a test image to a template to determine the correlation X therebetween with little, if any, modeling or mensuration required. In addition, the image correlation method and apparatus of the present invention can reliably correlate test images and templates which were obtained under different lighting or other environmental conditions or which were obtained from cross-spectral sources. Further, the image correlation method and apparatus of the present invention can reliably correlate a test image with a template regardless of the type, shape, location or material of the object designated within the template. Consequently, the image correlation method and apparatus of the present invention provides a versatile, reliable and rapid comparison of a test image with a template such that objects which were previously designated within the template can be quickly identified in the test image.

In the drawings and the specification, there has been set forth preferred embodiments of the invention and, although specific terms are employed, the terms are used in a generic and descriptive sense only and not for purpose of limitation, the scope of the invention being set forth in the following claims.

What is claimed is:

1. A method for correlating a test image with a template to identify a specific object wherein both the test image and the template are comprised of a plurality of pixels representative of respective predetermined gray levels, and wherein the template is partitioned into a plurality of labels comprised of at least one pixel, the method comprising the steps of:

dividing the template into a plurality of pieces;

comparing each piece of the template to a predetermined region of the test image such that at least some of the pixels of each piece of the template correspond to respective pixels of the test image and such that at least some deformation between the pieces of the template is permitted;

separately determining, for each piece of the template and for each of a plurality of predetermined gray levels j, the number of pixels of the test image $N_{j,i}$ representative of a predetermined gray level j which correspond to a predetermined label i of the respective piece of the template;

separately determining, for each piece of the template and for each of a plurality of predetermined gray levels j, the number of pixels of the test image $N_j$ representative of a predetermined gray level j which correspond to the respective piece of the template to identify said object; and separately determining the correlation X between each piece of the test image and the template according to:

$$X = \sum_{j=j_{min}}^{j_{max}} \sum_{i=i_{min}}^{i_{max}} N_{j,i} \ln \left[ \frac{N_{j,i}/N_j}{N_i/N_T} \right]$$

wherein $N_T$ is the total number of pixels which comprise the respective piece of the template, $N_i$ is the number of pixels which form each of the plurality of labels i of the respective piece of the template, $i_{min}$ and $i_{max}$ are the minimum and maximum label designations, respectively, and $j_{min}$ and $j_{max}$ are the minimum and maximum gray levels, respectively.

2. A method according to claim 1 further comprising the step of determining an overall correlation between the test image and the template, said overall correlation determining step comprising the step of summing the respective correlation determined for each piece of the template.

3. A method according to claim 1 further comprising the step of creating a plurality of relative offsets between the pieces of the template and the test image, wherein said comparing step comprises the step of comparing the pieces of the template to the test image at each relative offset, wherein said $N_{j,i}$ determining step comprises the step of determining, for each piece of the template and at each relative offset, the number of pixels of the test image $N_{j,i}$ representative of a predetermined gray level j which correspond to a predetermined label i of the respective piece of the template, wherein said $N_j$ determining step comprises the step of determining, for each piece of the template and at each relative offset, the number of pixels of the test image $N_j$ representative of a predetermined gray level j which correspond to the respective piece of the template, and wherein said correlation determining step comprises the step of determining the correlation X between the test image and each piece of the template at each relative offset.

4. A method according to claim 3 further comprising the step of separately determining the relative offset between the test image and each piece of the template which provides the greatest correlation therebetween.

5. A method according to claim 4 further comprising the step of determining an overall correlation between the test image and the template, said overall correlation determining step comprising the step of summing the respective greatest correlation determined for each piece of the template.

6. A method according to claim 3 wherein said relative offset creating step comprises creating respective relative offsets for each piece of the template which permit adjacent pieces of the template to partially overlap.

7. A method according to claim 3 wherein said relative offset creating step comprises creating respective relative offsets for each piece of the template which permit adjacent pieces of the template to be spaced apart by a predetermined gap.

8. An apparatus for correlating a test image and a template to identify a specific object wherein both the test image and the template are comprised of a plurality of pixels representative of respective predetermined gray levels, and wherein the template is partitioned into a plurality of labels comprised of at least one pixel, the apparatus comprising:

an image processor for dividing the template into a plurality of pieces;

comparison means, responsive to said image processor, for comparing each piece of the template to a predetermined range of the test image such that at least some of the pixels of each piece of the template correspond to respective pixels of the test image and such that at least some deformation between the pieces of the template is permitted, wherein said comparison means comprises:

means for separately determining, for each piece of the template and for each of a plurality of predetermined gray levels j, the number of pixels of the test image $N_{j,i}$ representative of a predetermined gray level j which correspond to a predetermined label of the respective piece of the template;

means for separately determining, for each piece of the template and for each of a plurality of predetermined gray levels j, the number of pixels of the test image $N_j$ representative of a predetermined gray level j which correspond to the respective piece of the template; and correlation means, responsive to said template processing means and said comparison means, for separately determining the correlation X between the test image and each piece of the template to identify said object according to:

$$X = \sum_{j=j_{min}}^{j_{max}} \sum_{i=i_{min}}^{i_{max}} N_{j,i} \ln \left[ \frac{N_{j,i}/N_j}{N_i/N_T} \right]$$

wherein $N_T$ is the total number of pixels which comprise the respective piece of the template, $N_i$ is the number of pixels which form each of the plurality of labels i of the respective piece of the template, $i_{min}$ and $i_{max}$ are the minimum and maximum label designations, respectively, and wherein $j_{min}$ and $j_{max}$ are the minimum and maximum gray levels, respectively.

9. An apparatus according to claim 8 further comprising the means, responsive to said correlation means, for determining an overall correlation between the test image and the template, said overall correlation determining means comprising means for summing the respective correlation determined for each piece of the template.

10. An apparatus according to claim 8 further comprising offset means for creating a plurality of relative offsets between the pieces of the template and the test image, wherein said comparison means is responsive to said offset means for comparing the pieces of the template to the test image at each relative offset, wherein said $N_{j,i}$ determining means comprises means for determining, for each piece of the template and at each relative offset, the number of pixels of the test image $N_{j,i}$ representative of a predetermined gray level j which correspond to a predetermined label i of the respective piece of the template, wherein said $N_j$ determining means comprises means for determining, for each piece of the template and at each relative offset, the number of pixels of the test image $N_j$ representative of a predetermined gray level j which correspond to the respective piece of the template, and wherein said correlation means comprises means for determining the correlation X between the test image and each piece of the template at each relative offset.

11. An apparatus according to claim 10 further comprising means, responsive to said correlation means, for separately determining the relative offset between the test image and each piece of the template which provides the greatest correlation therebetween.

12. An apparatus according to claim 11 further comprising the means, responsive to said greatest correlation determining means, for determining an overall correlation between the test image and the template, said overall correlation determining means comprising means for summing the respective greatest correlation determined for each piece of the template.

13. An apparatus according to claim 10 wherein said offset means creates respective relative offsets for each piece of the template which permit adjacent pieces of the template to partially overlap.

14. An apparatus according to claim 10 wherein said offset means creates respective relative offsets for each piece of the template which permit adjacent pieces of the template to be spaced apart by a predetermined gap.

* * * * *

UNITED STATES PATENT AND TRADEMARK OFFICE
CERTIFICATE OF CORRECTION

PATENT NO. : 5,890,808
DATED : April 6, 1999
INVENTOR(S) : Neff et al.

It is certified that error appears in the above-identified patent and that said Letters Patent is hereby corrected as shown below:

Column 17, line 10, after "value" cancel the comma (,).

Column 23, line 10, after "label" insert --i--; lines 22-24, in the formula, after "X" cancel the marking.

Signed and Sealed this

Fourteenth Day of September, 1999

*Attest:*

Q. TODD DICKINSON

*Attesting Officer*   *Acting Commissioner of Patents and Trademarks*